Aug. 17, 1965
J. A. HUNTER
3,200,510
ZERO DRIFT INERTIAL REFERENCE
Filed Sept. 25, 1961
2 Sheets-Sheet 1
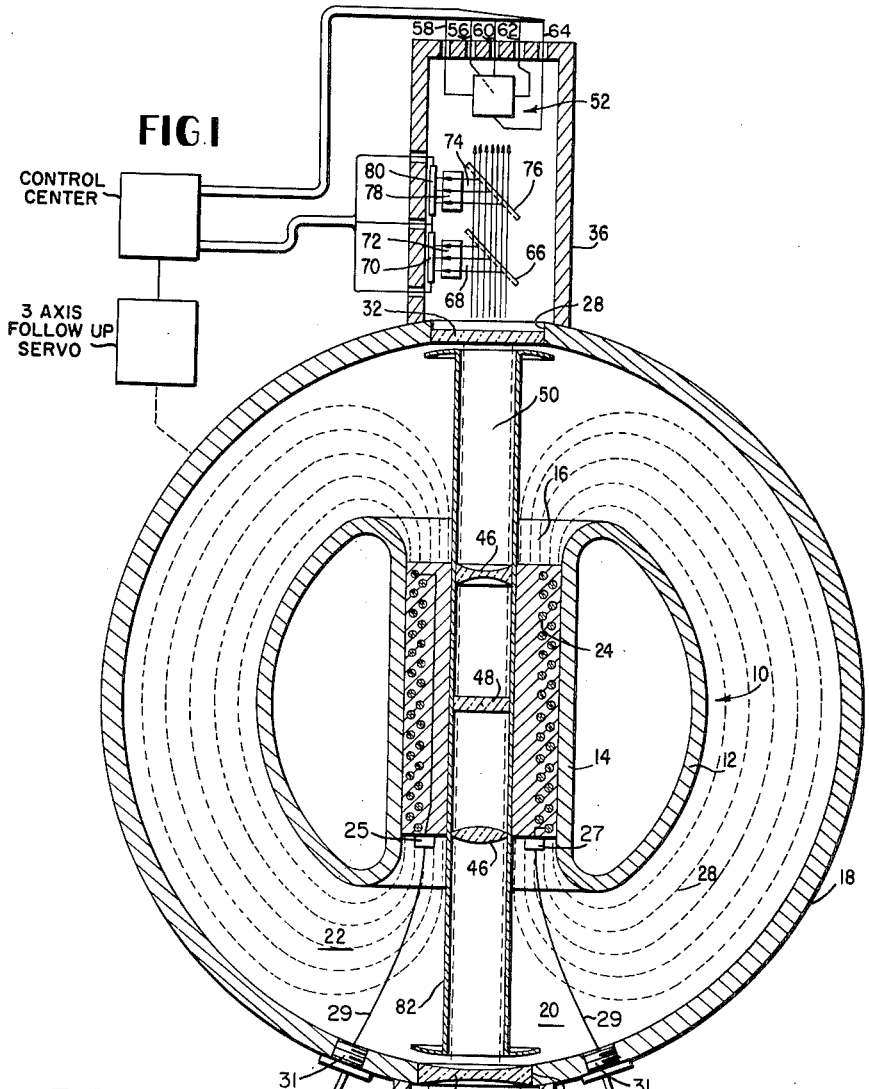
INVENTOR.
JACK A. HUNTER
BY William D. Roberson
ATTORNEYS

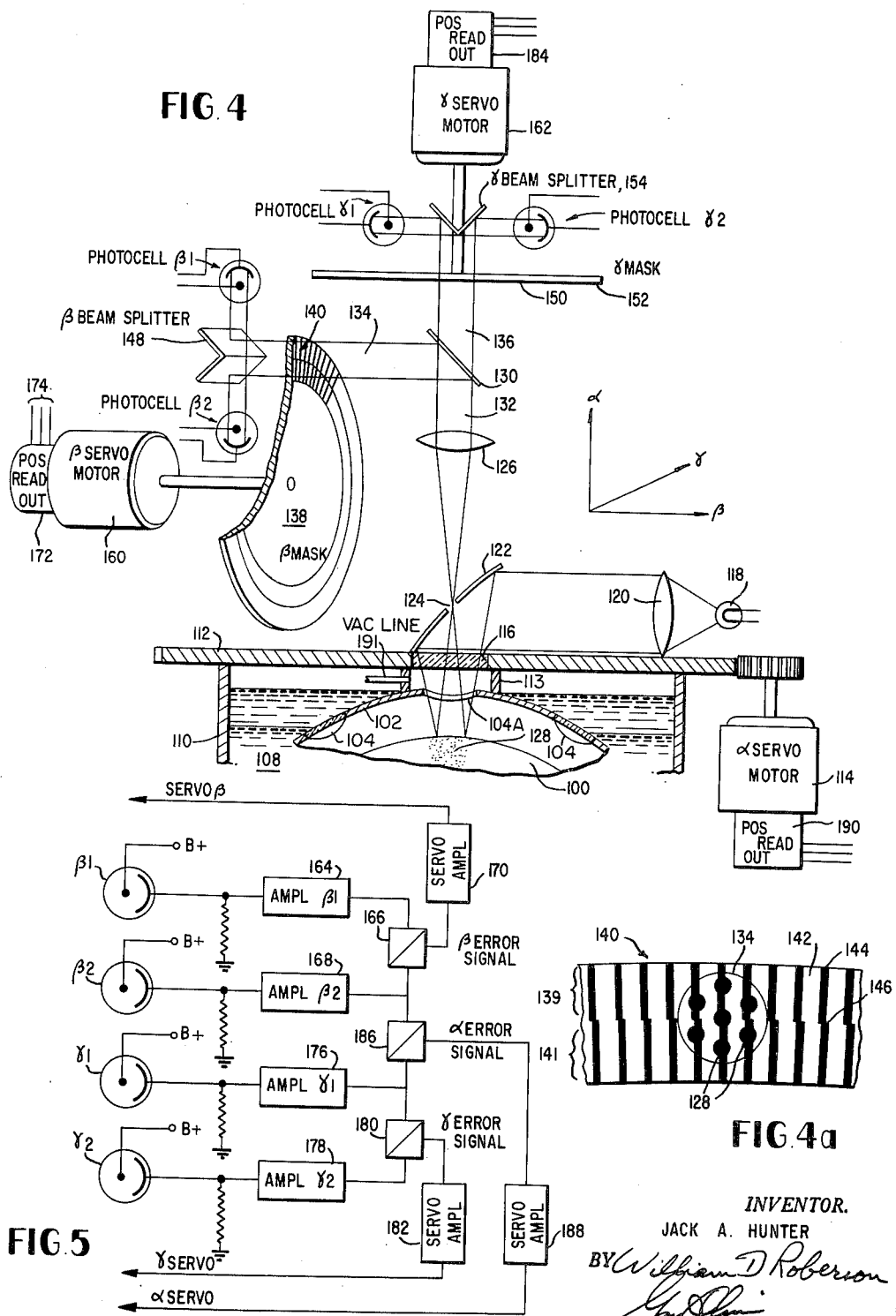

United States Patent Office 3,200,510
Patented Aug. 17, 1965

3,200,510
ZERO DRIFT INERTIAL REFERENCE
Jack A. Hunter, Baltimore, Md., assignor to Martin-Marietta Corporation, a corporation of Maryland
Filed Sept. 25, 1961, Ser. No. 140,288
22 Claims. (Cl. 33—204)

This invention relates to an inertial reference device such as a gyroscope and more particularly to a magnetic suspension system for such a device in which zero drift is achieved.

The conventional gyroscope and other inertial reference devices normally consist of a rotor mounted to spin rapidly about an axis and being free to rotate about one or both of the axes perpendicular to each other and to the spin axis. Mechanical gyros of this type are often used to maintain a predescribed position in space, wholly independent of the movement of the base upon which they are mounted, thus allowing a vehicle or other device to be navigated or directed over a predetermined course. In these mechanical devices, bearings, power feeds, and gimbal rings are provided so that for all effects and purposes, the spinning rotor is pivoted freely about a single point. Various pick-off devices are provided to measure the deviations of the base or vehicle axis from the direction of the mechanical gyro axis. The mechanical gyro will therefore maintain a fixed axial direction in space as long as there is no displacement torque exerted on the rotor. However, in practice, the mechanical gyros have positional drifts as a result of the various spurious torques imparted to the rotor by the imperfections inherent in such devices. Since bearings act to support the various components, friction torques are imparted to the rotor through these bearings. Any unbalances in the rotor or gimbal ring or any shifts in position will produce torques whenever acceleration is experienced. In the most efficient gyro system, the accelerations normally encountered cause a drift rate from .5 to 5 degrees per hour for gyros used in aircraft navigation and the like. While the drift rates have ben reduced in mechanical gyros by decreasing the size of the elements, increasing the angular momentum of the rotor and by providing gimbal bearings having a minimum friction, the complete solution to this problem has not been achieved in gyros of this type. In the field of naval navigation an inertial reference device with a zero drift rate would have extreme advantages, especially when used in navigation systems for submarines, since it is a normal requirement that the submarine surface periodically in order to correct gyro positional deviations caused by inherent drift.

It is therefore a principal object of this invention to provide an inertial reference device in which the drift rate is zero.

The field of cryogenics has been founded on the knowledge that certain materials consisting of metals and alloys have the property of superconductivity which they exhibit at extremely low temperatures. Super-conductivity or the state of zero electrical resistance in many metals is due to the appearance at low temperatures of electrons endowed with the remarkable property of being able to travel through certain materials without the slightest trace of electrical friction. A second characteristic of a super-conductive material, is the fact that a magnetic field cannot penetrate a super-conductor. With these characteristics of a super-conductor in mind, and the principle that magnetic lines have elastic characteristics, that is, either the compression of a magnetic field or the stretching of the length of the magnetic line increases the magnetic field energy, it is a further object of this invention to make use of these principles to provide a frictionless, magnetic supporting system for an inertial reference device which is inherently stable in three dimensions.

It is another object of this invention to provide an inertial reference device having zero drift in which the inertial mass is non-spinning.

Additionally, in the conventional mechanical gyros, where a high speed rotor is employed, the rotor is operated in a medium such that the rotor is subjected to a certain amount of friction between itself and the atmosphere in which it is rotating. Also, the coupling between the pick-off means and the rotor or the gimbals supporting them provides additional frictional drag. It is another object of this invention to provide an inertial reference device of the type having zero drift in which the residual friction is less than that of any known existing reference device.

Various suspension means are provided for suspending the inertial mass in a conventional mechanical gyro. Such devices may take the form of pneumatic or electromagnetic means for both driving the rotor at a high speed and for supporting the rotor about the axis of rotation. In either case, either mechanical or electrical energy must normally be continuously supplied to retain the inertial mass in a supported position at the desired rotor speed.

It is a further object of this invention to provide an inertial reference of the zero drift type in which, once the system is placed into operation, no further energy is required to effect support of the inertial mass, except that required to sustain operation at a desired operating temperature.

Other objects of this invention will be pointed out in the following detailed description and claims and illustrated in the accompanying drawing, which discloses, by way of example, the principle of this invention and the best modes which have been contemplated of applying that principle.

In the drawings:
FIG. 1 is a schematic sectional elevational view of one embodiment of this invention employing optical means for obtaining a 3-axis readout;
FIG. 2 is a plan view of another embodiment of this invention;
FIG. 3 is an enlarged view of a portion of the outer shell of the device of FIG. 2;
FIG. 4 is a schematic elevational view, partially in section of the apparatus of FIG. 2 including optical readout means;
FIG. 4a is an enlarged front view of a portion of the mask forming part of the optical readout apparatus of FIG. 4;
FIG. 5 is a schematic view of the summing network applied with the apparatus of FIG. 4.

In general, this invention contemplates a suspension system for a zero drift inertial reference device, including a first body formed of a super-conductive material and a second body also formed of a super-conductive material surrounding and spaced from the first body. A magnetic field exists between the bodies and means are provided for sustaining super-conductivity within both bodies. Since magnetic lines will not penetrate a super-conducting body, the magnetic field will be confined between the bodies and the inner body seeks a position of minimum magnetic field energy corresponding to a central position within the outer body. In one embodiment, the first body is of hollow, generally torus configuration including an inner cylindrical wall and an outer spherical wall, with means associated with the inner cylindrical wall for providing a magnetic suspension field. Optical windows are formed in the super-conductive elements along the axis of the magnetic field to allow optical readout means to indicate deviation of the outer body with respect to the inner body about orthogonal axes.

Referring to the drawing, there is shown in FIG. 1 a first body 10 consisting of a shell of torus shape having an outer spherical wall 12 and an inner cylindrical wall 14 forming a torus with a central hole or opening 16. The torus shaped shell or float 10 may be formed totally of a material exhibiting super-conductive properties such as niobium, which at 4° K. has a critical field intensity $H_c$ of approximately 2000 gauss. However, a choice of materials may be used, providing the materials are properly matched to the operating temperature and magnetic field strength. Construction my be simplified and made less expensive by use of a material having the desirable mechanical properties without restricting it to being a super-conductor as long as it is capable of supporting a super-conducting surface. For the purposes desired, the super-conducting surfaces need only to be a few thousandths of an inch thick and a niobium surface on a quartz support would provide a desirable structure.

A spherical shell forms the second super-conductive body, the shell 18 surrounding the torus shell 10. Shell 18 is of sufficient diameter as to provide a space or gap 20 between the two shells 10 and 18. In like manner to shell 10, the shell 18 may be constructed wholly of a super-conductive material, or it may include only a thin layer of niobium or the like on the inner surface. The inner surface of the outer shell 18 acts in conjunction with the outer surface of the inner shell 10 to sandwich a magnetic field 22 therebetween.

The magnetic field 22 is produced initially in a device shown in the drawing by suitable energization of an electromagnetic coil 24 which is positioned axially and centrally within the central opening 16 of shell 10. The electromagnetic coil 24 is preferably imbedded in a sleeve 26 which may be formed of any conventional non-magnetic insulating material such as Teflon, talc, or amber, etc. The coil may be suitably connected to a source of direct current through the use of opposed contacting surfaces 25 and 27 which are insulated from each other and are fixed to one end of the sleeve 26. The contact surfaces 25 and 27 are connected to opposite ends of the coil 24. Removable leads 29 are inserted through appropriate gasket means 31 formed at the bottom of the outer shell 18 allowing initial energization of the electromagnetic coil 24 to produce the supporting magnetic field. After energization and suspension of the magnetic field, the D.C. current supply is shut off and the leads 29 are removed through the gasket members 31. Energization of the coil 24 produces the magnetic field 22 surrounding the torus shaped shell 10. Since the magnetic field cannot penetrate a superconductor, such as shell 10 or shell 18, the magnetic field 22 is confined between the two super-conducting surfaces. Further, since either compression of the field or stretching the length of the lines increases the field energy, the internal shell 10 will seek a position at the center of the spherical shell 18 which corresponds to minimum field energy. The only limitation with respect to the field strength of the magnetic field 22 is that the field strength lies below the critical field ($H_c$) for transition of the super-conductors to the normal conducting state. Providing there is no trapped magnetic flux in the super-conductors and that the surfaces of the shells 10 and 18 are geometrically perfect, the float or inner shell 10 is then supported with a complete absence of disturbing torques and with zero drag or friction. With this suspension system, the spherical shell 18 may be rotated about any axis, and the float or shell 10 will remain in its position in a truly inertial state and will not follow the rotation of shell 18. However, if shell 18 is displaced by a translation, the float 10 will follow the displacement with considerable rigidity. Specifically, the outer shell 18 together with its appurtenances is supported in a three-axis gimbal system and positioned by the output signals from the position indicators 70 and 80 in such a manner as to cause the shell 18 and its appurtenances to maintain a coaxial relationship of the float 10 and said outer shell 18. The action of the servo system thereby provides a read-out signal of position of the float.

While the float 10 is shown to be a torus with the spherical portion of its periphery concentric with the spherical inner surface of the outer shell 18, the float can take other forms such as for example, an ellipsoid. Considerable variation in the lateral restoring force may be obtained by a slight variation of float contour. With respect to any translation of the outer shell 18, the float or shell 10 will be likewise translated with no induced rotation of the float as long as the restoring force is directed through the center of the mass of the float. It may, therefore, sometimes be necessary to adjust the float contour so that the restoring force resulting from displacement is the same in all directions to insure that translation will not induce rotation of the float with respect to the shell. Since a frictionless suspension system is provided, no energy is dissipated in a displacement of the float with respect to the spherical shell, and the displacements will result in undamped oscillation of the float. These oscillations could be reinforced by random accelerations of the system and thus result in errors due to the non-linear characteristics of large displacements. Several methods of dampening may be introduced. One of the simplest is the introduction of a fluid into the region between the float and the spherical shell. In this respect, viscous damping would be achieved and in the case of a non-spinning float, only small errors would be introduced as a result of the friction inherent in the use of the fluid. Since necessarily, the float 10 and the shell 18 must be subjected to extremely low temperatures to insure that the materials remain super-conductive, liquid helium or liquid hydrogen is a suitable damping fluid, since these fluids also provide the refrigeration necessary. In order to reduce the error which would be inherently present in the use of a fluid between the float and the spherical shell, an alternative method of dampening would be achieved by mounting the spherical shell 18 in a gimbal system such that damped translational (non-rotational) displacement is permitted. In this case, the energy of oscillation of the float 10 is then transferred to displacements of the shell which may then be absorbed by a viscous movement of the helium or hydrogen bath outside the shell or by auxiliary dampeners attached to the axis of the gimbal system.

While the magnetic field 22 is originally set up in the apparatus shown in the drawing by electromagnetic coil 24, a simplified system may include a permanent magnet positioned within the opening 16 of the float 12 with axial poles for providing the desired magnetic field. The most suitable type of magnet would be one having low density to reduce the acceleration effects and one having great magnetic stability. One such suitable permanent magnetic material is "Ferrimag" (barium ferrite, $BaO_6Fe_2O_3$) which has a coercive force in excess of 1500 oersteds and a density of 0.170 pound per cubic inch. Flux densities in excess of 2000 gauss are obtainable, which are greater than required. This material has a resistivity in excess of $10_6$ ohm-centimeters at 25° C. which should minimize any eddy current effects due to "frozen in" fields in the spherical shell. The space 20 is subjected to a vacuum by conventional means in order to first reduce the drag forces between the relatively moving shells and secondly because the operating temperatures to which the shells are subjected will freeze any residual air. While it is essential that the super-conducting surfaces be geometrically accurate and that only symmetrical deviations which are balanced may exist, the float system is statically and dynamically balanced to a much lesser degree than a gyro normally including a spinning rotor.

While the device incorporatiing a permanent magnet for providing the necessary magnetic field will operate satisfactorily, the permanent magnet would introduce a problem of "frozen in" fields since it can not be "turned-off" while the float and shell are made super-conducting. A preferred embodiment provides a means for replacing the permanent magnet with a persistent current on the inner super-conducting wall 14 of the float 10 which will provide a magnetic field indefinitely. In the present invention, a circulating electrical current is induced by removable electrical leads 31, and maintained in a material held at super-conducting temperature with no trace whatsoever of electrical resistance to the circulation of the current present. While this current generates a magnetic field identical to that of the permanent magnet it replaces, it is much easier to induce this persistent current after the inner surface of the shell has been made super-conducting than it is to insert the permanent magnet after the outer element is super-conducting. This is extremely desirable since it permits a greatly reduced level of "frozen in" flux and the attendant difficulties resulting from the presence of this flux.

Float 10 is preferably formed of material having a lower temperature for transition to the superconducting state than that of the material forming the outer shell 18. The outer shell 18 could be, for example, made of nibium and the inner float 10 could be made of tin. After the shell 18 has been made super-conducting while in a zero magnetic field by lowering the temperature sufficiently, a magnetic field is applied by means of electromagnetic coil 24 which generates the same number of flux linkages through the center of the torus as the desired support field. When the magnetic field is applied by subjecting coil 24 to a suitable current flow, the system should be at a temperature such that $H_c$ for the shell 18 is greater than H while the float 10 is not super-conducting. After further lowering the system temperature, until torus 10 is also made super-conducting with $H_c$ greater than H, the magnet is either shut off or removed depending upon the particular design. In the embodiment shown, the magnet remains within the apparatus and is merely shut off and the converting electrical leads removed. As a result, a persistent current is then generated within the torus which will flow indefinitely without reduction in strength. Therefore, once the system is placed into operation, no further electrical energy is required to effect support of the inertial mass, since the persistent current within the torus provides this function. The only requirement to sustaining operation is to provide sufficient energy to maintain the operating temperature low enough so that the float 10 and the shell 18 remain super-conductive.

Since the inertial reference device of the present invention allows an orthogonal output, means must be included for reading out or detecting the relative positional change between the float 10 and the spherical shell 18. The present invention advantageously makes use of the flux nodal point of the flux field to allow penetration of the opaque super-conductive shell for three axis readout with negligible effect on the suspension system. With regard to the embodiment of FIGURE 1, since the flux is theoretically zero at the pole positions the shell 18 is penetrated at this point to provide opposed openings 28 and 30. A circular window 32 is positioned in opening 28 and lens 34 is positioned in opening 30. Elements 32 and 34 are optically and magnetically permeable but fluid impermeable. Either element may be associated with means (not shown) to provide and maintain a vacuum between the inner float and the outer shell. The penetrations at points 28 and 30 allows the use of a simple optical system which detects the displacement of float 10 and develops proper command signals for a servo system (not shown) which serves to control a stable inertial platform (not shown). The optical system employs a pair of casing members 36 and 38 positioned adjacent the openings 30, and 28, and are shown as being coupled to the outer surface of shell 18. In the lower casing 38 there is provided a light source 40 which directs a light beam 42 through lenses 44 and 34 into the shell 18 and through the hole 16 of float 10. A pair of lenses 46 are positioned on either side of a light polarizing lens 48 for directing a beam 50 of polarized light through window 28 into casing 36 which includes the photo-sensitive detector means for detecting triaxial deflection. The arrangement for measuring the angular deflection of the float with respect to its axis of symmetry includes a photoconductor inclination detector indicated generally at 52 which consists of a photoconductive surface which receives the light beam 50. When there is no deflection, the light beam is centered on the surface of the detector 52 and all of the resistances between common lead 56 and the leads 58, 60, 62 and 64, attached to the four outer edges respectively are equal. However, if the float 10 is rotated with respect to the shell 18 the light beam 50 is deflected to a position illuminating more of the material between the common lead 56 and terminals 62 and 64, for example, causing larger currents to flow to these two termnials and thus directing the servo system (not shown) to make a correcting rotation of the shell 18 in the proper direction.

In order to obtain readout of the rotation about the axis of float symmetry, polarized light means are employed. The single polarizer lens 48 is attached to the float 10 so that the light beam 42 produces a polarized beam with an angle of polarization which rotates with the float. The polarized beam 50 entering the detector housing 36 may then be split for example, by a quarter silvered mirror 66 with a portion 68 of the beam contacting a photocell 70 after passing through a second polarizer 72. A second portion 74 of beam 50 is reflected, for example, through a beam splitting silvered mirror 76 and is directed through an associated cooperating polarizer 78 which is oriented at a slightly different angle from polarizer 72 onto a second photocell 80. Thus, rotation of the polarizer 48 from a neutral position would result in increasing the light falling on one of the photocells such as photocell 70 and decrease the light falling on photocell 80 to indicate the degree and direction of rotation of float 10 with respect to shell 18. The system shown therefore, permits a single float to provide a three-axis readout without any substantial interference with the flux field 22. Reference to FIGURE 1 shows a control center receiving the signals indicating relative rotation of the float 10 with respect to the outer sphere 18 about any one of the three axes. The control center provides a suitable signal to a three-axis follow-up servo system for reorienting the outer sphere with respect to the immovable float 10 to ensure alignment of sphere 18 with float 10 with respect to all three axes.

Since penetrations larger than infinitesimal interfere with the flux path at the nodal point, the penetration does induce some coupling of the float to the shell. If the coupling unduly limits the performance of the system, it can be greatly reduced by the inclusion of another super-conducting element which may act to isolate the majority of the magnetic flux from the inner wall 14 of float 10 providing the magnetic field. In the FIGURE 1 embodiment, a tube 82 of super-conducting material is positioned about the axis of symmetry and is of a larger diameter than the penetration. The length of the tube is slightly less than the internal diameter of the shell so that it does not interfere with relative movement between the float 12 and the shell 18, but it does serve to reduce the flux fringing into the shell penetrations.

A second embodiment is shown in FIGURES 2, 3 and 4 which offers certain advantages over the embodiment shown in FIGURE 1. The inertial reference device consists of a spherical super-conductor 100 which serves as a reference mass in the same manner as the float 10 of the FIGURE 1 embodiment. The sphere 100 is surrounded by a second super-conducting spherical shell 102 which acts both as a source of and the means for confining a magnetic suspension field which is employed to position the sphere 100 centrally of the shell 102. The spherical shell 102 is penetrated by a number of openings 104 which are circular in form. The perimeter of each of these circular openings constitutes a closed loop electrical circuit about the opening 104. Each opening which may be designated as magnetically positive, will be surrounded by openings designated as magnetically negative and each negative pole will likewise be surrounded by positive poles. The positive and negative designations are derived from the direction in which the current flows through the persistant current perimeters, and are thus based on the magnetic polarity of the magnetic field within the circular openings 104. One such arrangement requires eight equally spaced openings. The openings 104, FIGURES 2 and 3, are covered by fluid impermeable material which is magnetically permeable, while opening 104A has no covering. Opening 104A allows the creation and maintenance of a suitable vacuum between the inner and outer spherical members without interferring with the passage of magentic fields through openings 104. One arrangement is shown in FIGURE 4, wherein opening 104A provides fluid communiction between vacuum line 191 from a source (not shown) to support tube 113 which surrounds the uncovered opening 104A. The level of the liquid helium 108 is above the plane of the opening 104A and tube 113 fixedly couples the spherical shell 102 to table 112. The spherical float is suspended by a total magnetic field which is imposed by persistent circulating currents in the rim of the openings 104. While it would be possible to float the spheres by having only two openings, one of which would allow ingress of the field and the other of which would permit its exit, such as geometry undergoes small changes in field energy for a lateral displacement of the float. The additional openings provide a much greater change of field energy for a given displacement and thus provide a stiffer suspension. The same general requirements as discussed above exist for the selection of material in regard to the critical field strength at the operating temperature. In a typical construction, the spherical float 100 may comprise a quartz sphere having a thick film of niobium on its outer surface while the spherical shell 102 may be made of any suitable structural material coated on its inner surface with a thick film of niobium. The whole system is positioned within a magnetic shield, evacuated and immersed in liquid helium 108 within a cryostat 110 in the same manner as discussed with regard to the embodiment of FIGURE 1. In setting up the system for operations, the spherical shell is positioned around the float and the elements placed in a magnetic shield and evacuated. The temperature of the system is lowered to a point where the surface of the spherical float 100 would become super-conducting with a value of the critical field strength being greater than the maximum operating flux. At this point the magnetic field of appropriate polarity is generated by magnets or coils located at each of the openings in the shell. Coils, such as 101, are positioned exteriorly of shell 102 and coaxial with openings 104 and 104A. The coils are selectively connected to a source of voltage, such as battery 105 by closing switch 107, thereby completing the electrical circuit through line 103. With the openings being subjected to appropriate magnetic fields, the temperature is reduced, until the outer shell becomes super-conducting, at which point the external field forces would be removed or turned off. The apparatus is then in an operating state. One specific method which would be applicable in a system in which both the inner float and the outer shell have super-conductive surfaces of the same material, the procedure in this case would entail the lowering of both materials to a temperature below the critical temperature wherein both the outer shell and the inner float become super-conducting. If the temperature is then raised, is is apparent that the outer shell will reach a temperature above the critical temperature before the inner float, due to the thermal coupling of the inner sphere or float to the outer shell which would naturally cause it to lag. If the coils 106 are energized during this lag time when the outer shell is in the normal state and the inner float is super-conducting, a magnetic suspension field will be set up.

The temperature is then lowered before the inner float reaches the critical temperature, thereby lowering the temperature of the outer shell to the point where it reaches the critical temperature, and thus both the float and the outer shell will be super-conducting. At this point the energizing coils 106 are shut off with the apparatus in an operating state.

In the embodiment shown in FIGURES 2 and 4, all of the openings 104 of shell 102 may be closed off by a non-magnetic, non-super-conducting material which may be opaque with the exception of opening 104 adjacent the aperture 116 of support member 112 which in this case is used as part of the optical sensing system. In addition, one of the other holes or openings 104 is used to allow a vacuum line to be inserted between the inner float 100 and the outer shell 102 to insure that the float is positioned in a vacuum and suspended by the magnetic means. This arrangement of course insures that the liquid helium bath 108 is prevented from entering the vacuum space between the float 100 and the shell 102.

In the embodiment of FIGURE 1, the torus shaped float and outer spherical shell are constructed of materials having different super-conductive characteristics. In this case, the temperature of the system is lowered until the outer spherical shell 18 becomes super-conductive, the electromagnetic coil 24 is energized to create the necessary magnetic suspension field and then the temperature of the system further lowered until torus 10 becomes super-conductive and a persistent current is set up therein. However, the float 10 and the shell 18 may be constructed of the same material having identical super-conductive characteristics, whereby the sequence of events required to set up a persistent current in the torus shaped float 10 may be achieved wholly through temperature control. It is only necessary that the spherical member of the system become super-conducting first. In this respect, with regard to the embodiment of FIGURE 2, both the inner spherical float 100 and the outer shell 102 may also be of the same super-conductive material, but in this case the inner spherical float would be made super-conductive first, magnetic suspension fields set up in the openings 104 and 104A and then the outer shell be made super-conducting. In both the embodiments shown in FIGURE 1 and FIGURE 2, it is apparent that the adjacent surfaces of the bodies are of such configuration as to allow complete freedom of relative rotary movement in all directions. In either case, one of the bodies is completely spherical and substantially magnetically and physically unfeatured. For the purposes of the present invention, the surface must be physically smooth to allow complete freedom of relative rotary movement in all directions, while at the same time being characterized by the absence of magnetic anomalies of a macroscopic scale which would tend to present a returning force to one of the bodies with respect to the other as a result of said relative rotary movement in any one of the directions. The term "substantially" is used to indicate that any departure from a completely featureless condition does not in any way affect the operation of the system. Thus, in the FIGURE 1 embodiment, the presence of the covered aligned openings on opposite ends of the outer shell 18 occurs at the nodal point of the confined magnetic field and therefore, the departure does not in any way affect the operation of the system. In this case, elements 32 and 34 are magnetically permeable closures which are fluid impermeable and which, in this case, are optically clear. In the embodiment of FIGURE 2, the coverings or closures about the openings 104 are likewise impermeable to fluids but permeable to magnetic fields.

In the embodiment of FIGURE 2, the readout can be accomplished by optical means wherein orthogonal rotation of the external shell with respect to the internal mass is detected by beam reflections from the surface of the inner sphere instead of transmission through a hole in the float. With this type of design the float can be reduced to a completely symmetrical spherical body rather than having the torus shape configuration as in FIGURE 1, which would eliminate the problem of contouring the surface to provide a restoring force always directed through the center of the mass. In the use of a spherical float, this condition is an inherent feature.

Specifically, FIGURE 4 shows the cryostat 110 coupled to a rotating table 112 which together with the servo systems β and γ rotates about the vertical or alpha axis in response to energization of the alpha servo motor indicated at 114 to which it is coupled mechanically. It may be stated at this point that the outer shell 102 is fixed to the rotating table 112 by suitable means while the beta servo motor 160 and the gamma servo motor 162 are also fixed to the rotating table 112 in the position shown. Therefore, any rotation of the output means of the alpha servo motor 114 will result in rotation of the table 112 about the vertical or alpha axis and will also rotate the servo motors 160 and 162 and their associated members about the same axis. Centrally of the rotating table 112 is an opening 116 which is aligned generally with one of the openings 104A formed within the outer spherical shell 102. A suitable light source 118 projects a light beam through lens 120 onto a concave mirror 122, with the mirror orientated to direct the light beam downwardly through the aligned openings 116 and 104 onto the surface of the reference sphere 100. The light beam 132 is reflected from this surface and passes upwardly through a central opening 124 formed within the mirror onto a second lens 126 to provide a real image of the reflected pattern from the surface of the reference sphere 100. In order to provide a surface character to the sphere 100, it is overprinted with a hexagonal array of non-reflective dots 128, this being an appropriate pattern which will fit the surface of the sphere without any break in the uniformity of the pattern at any point on the sphere and, by use of vector summation, allow orthogonal readout. It is an object of the readout system to observe the movement of the optically reflected hexagonal pattern of dots and thus compute the rotational displacement of the sphere about orthogonal axes. The appropriate selection of the lenses 120 and 126, the mirror 122, and the positioning of these elements provides a focal length which will provide a real image at the position of the masks 140 and 152. A half-silvered mirror 130 intercepts the beam 132 from lens 126 and divides the light beam 132 into two equal portions 134 and 136, which are oriented at right angles to each other. Additional focusing lenses may be utilized to determine the conditions of proper focusing. Each of the split beams next passes through the periphery of a circular disc which contains a suitable optical mask. For instance, beam 134 passes through the periphery of a circular disc 138 which contains an optical mask portion 140 at the outer periphery thereof. FIGURE 4a is an enlarged view of the portion of this disc containing the mask. The mask, for example, may consist of a first series 139 of equally spaced transparent and opaque segments, 142 and 144 respectively, adjacent the outer periphery of mask 138 and a second series 141 positioned at less radial distance and adjacent to the first series with the two portions 139 and 141 of the mask being slightly offset with respect to each other. It is important that the spacing of the opaque sections 144 be equal to the separation of adjacent rows of dots 128 in the optical image. In FIGURE 4a, the light beam 134 is indicated as being circular in form and the individual dots are indicated at 128. It is apparent from viewing FIGURE 4a that the hexagonal pattern of dots 128, acting in conjunction with the offset mask portions, are effective in determining both the phase and the magnitude of the rotational deviation of the outer shell 102 with respect to the inner shell 100. After passing through the mask, the light beam 134 is again split at the line of junction 146 between the offset boundary in the mask. Suitable reflectors or mirrors 148 are provided for splitting beam 134, whereupon the split beam passes to a pair of associated photocells indicated at beta 1 and beta 2.

It can be seen from reference to FIGURE 4a that it is possible for the reflected light beam 134, which contains the hexagonal character pattern of dots 128 to be aligned with respect to the pattern of the mask comprising the alternate, dual series of equally spaced transparent and opaque segments, such that at certain positions of the mask, maximum light will be transmitted. In addition, due to the slight displacement of the two portions 139 and 141 of the mask, it is possible to detect the phase or angular direction of error in alignment.

The other portion 136 of the light beam passes through a second disc 150 which has a mask 152 identical to the mask portion 140 of disc 138. The beam splitter 154 acts to split the portion of the beam 136 passing through mask 152 and to direct separate beams onto a pair of associated photocells gamma 1 and gamma 2 with the operation occurring in an identical manner to the apparatus associated with servo motor 160. It is apparent that rotation of float 100 about the gamma axis, that is, an axis normal to the plane of the paper, FIGURE 4, will require a rotation of the gamma servomotor 162 and its mask 152 by a like amount, if the condition of maximum light transmission is to be maintained. For a rotation about a beta axis, that is, an axis lying horizontally in the plane of the paper, no change in the position of the gamma servosystem is required to minimize the error signal. However, such rotation about the beta axis will produce a displacement of the optical pattern of dots 128 with respect to the beta mask 138. The resulting error signals out of the beta amplifiers will produce rotation of the beta servomotor in the same direction as the displacement of the optical pattern of dots 128 about the beta axis by the float rotation divided by the sin of 60°. The position readouts are then given by a simple trigonometric relationship as follows: Gamma axis readout equals the gamma servo rotation and the alpha axis readout equals the alpha servo rotation divided by the ratio of gears connecting it to the optical table 112. Beta axis readout equals the beta servomotor rotation divided by 0.866 minus one-half the gamma servomotor rotation divided by 0.866 if the dot pattern is a hexagonal array.

The portion of the optical readout system associated with the beta servo motor 160 will act to determine a rotational deviation of the test reference system with respect to the inner sphere 100 about the horizontal or beta axis. Since the gamma readout system axis is not orthogonal to the beta axis, the second orthogonal readout is obtained by a proper vector summation of the beta axis and gamma axis readouts. One such set of orthogonal axes is given by $$x=\alpha;\ y=(\beta-\alpha \sin 30°)\frac{1}{\cos 30°};\ z=\alpha$$

However, should there occur a rotation of sphere 102 (including table 112 and the servo systems β and γ) with respect to the inner float 100 about the alpha or vertical axis, this in effect will cause a rotation of the hexagonal pattern about both the beta mask 138 and the Gamma mask 150. This will affect the photocells associated with both the beta servo motor 160 and the gamma servo motor 162. By suitably coupling the output of each of the photocells associated with the beta servo motor 160 to the proper photocell associated with the gamma servo motor 162, and by employing an appropriate summing network, the proper vector addition of these output signals is achieved to indicate a rotation about the third axis, namely an axis parallel to the reflected light beam.

Referring to FIGURE 5, there is shown schematically the summing network including the four photocells, beta 1, beta 2, gamma 1, and gamma 2 for providing orthogonal error signals which are fed to associated servo motors 114, 160, and 162. For instance, photocell beta 1 is connected to a suitable amplifier 164, allowing the amplified output signal to be fed to a summing device 166. The second photocell beta 2 associated with the beta servo motor is also connected to the summing device 166 through its amplifier 168, such that the parallel input to the summing device 166 provides a beta error signal which is fed to the beta servo amplifier 170 and thence to the beta servo motor 160. The beta servo motor 160, in response to the error signal, acts to reposition the rotating disc 138 such that the mask portion 140 moves to the initial null position whereby light rays of equal intensity fall upon the photocells beta 1 and beta 2. Of course the movement of the disc 138 and its associated mask is translated into terms of a mechanical change in the positional readout portion 172 of the servo motor and thus provides an output signal commensurate with rotational deviation of the test reference system with respect to float 100 about the horizontal or beta axis.

In like manner, photocells gamma 1 and gamma 2 are connected to their respective amplifiers 176 and 178 and jointly to a signal difference device 180 for providing a gamma error signal. This error signal is amplified by gamma servo amplifier 182 where it is fed to the gamma servo motor 162 for repositioning the disc 150 and its associated mask 152 such that the photocells gamma 1 and gamma 2 will receive beams of equal light intensity and reposition the mask in the null position. The rotation of the disc 150 to achieve a null position will result in a position readout signal being generated within readout device 184 in the same manner as that occurring in readout device 172 associated with the beta servo motor.

To indicate rotation of the system about the inner sphere 100 along the alpha axis, which lies vertically along the axis of beam 132, FIGURE 4, the outputs of the photocells beta 2 and gamma 1 are coupled by means of their associated amplifiers 168 and 176 to a difference device 186, thus providing an alpha error signal which is fed through its servo amplifier 188 to the alpha servo motor 114. This error signal arises due to the fact that a rotation about the alpha axis will produce a rotation of the optical pattern of dots 128 on the mask 138, such that the dots falling on the portion of the mask identified as 139 will be displaced in one direction, while dots 128 falling on the portion of the mask identified as 141 will be displaced in the opposite direction. These displacements will result in the diminution of light transmitted and a change in the output of the photocells beta 1 and beta 2, such that they provide equal and opposite signals to the beta error detector 166 through their respective amplifiers 164 and 168. The output of the photocells gamma 1 and gamma 2 are similarly affected by rotation of pattern 128 on mask 150.

By taking an error signal constituting a difference reading between the outputs of the gamma 1 photocell and its amplifier and the beta 2 photocell and its amplifier, a signal is derived which will drive the alpha servo motor 114 in a direction to rotate the table 112 such as to realign the optical pattern 128 falling on masks 138 and 150 to maximize light transmission. The rotation of table 112 serves directly to provide the alpha axis readout signal. This results in rotation of the table 112 causing the $\beta$ and $\gamma$ detector systems to reposition theirselves with respect to the inner shell 100 whereupon an hexagonal pattern is correctly re-positioned with respect to both the beta mask 140 and the gamma mask 152. Of course, the rotation of the servo motor will generate a position readout signal in the portion of the system associated with the alpha servo motor 114 thus providing an appropriate means of measuring the respective rotation between shell 100 and the test reference system. Rotation of table 112 will also cause the hexagonal pattern of dots associated with light beam 132 to reach a position of alignment with respect to both masks with resultant elimination of the error signal from difference device 186.

While there have been shown and described and pointed out the fundamental novel features of the invention as applied to various embodiments, it will be understood that additional omissions and substitutions and changes in the form and details of the devices illustrated and in the operating thereof may be made by those skilled in the art without departing from the spirit of the invention. It is the intention, therefore, to be limited only as indicated by the scope of the following claims.

What is claimed is:

1. A zero drift inertial reference device of the nonrotating type comprising: a first body formed of superconducting material, a second body formed of superconducting material completely surounding and spaced from said first body, the adjacent surfaces of said bodies being of such configuration as to allow complete freedom of relative rotary movement in all directions, means for maintaining said bodies in a superconducting state and means for providing a magnetic field between said bodies, whereby said first body seeks a position centrally of said second body corresponding to a position of minimum magnetic field energy.

2. The device as claimed in claim 1 wherein one of said bodies is spherical and substantially magnetically and physically unfeatured.

3. The device as claimed in claim 2 wherein said second body has at least a niobium inner surface and said first body has at least a niobium outer surface.

4. The device as claimed in claim 2 wherein said second body comprises a substantially closed sphere, said first body is of torus configuration including a central hole and the poles of said magnetic field are axially aligned with said hole.

5. The device as claimed in claim 2 wherein said second body comprises a substantially closed sphere having an inner superconductive metal surface, said first body comprises a hollow, generally torus-shaped float including an outer spherical portion and an inner tubular portion formed of a material having superconductive properties and said means for providing a magnetic field comprises a persistent current circulating about said inner tubular portion of said torus-shaped float.

6. The device as claimed in claim 2 wherein said first body comprises a spherical float and said second body comprises a spherical shell completely surrounding said first body and spaced therefrom, said second body includes a plurality of spaced, circular areas characterized by the absence of superconducting material, means for setting up a persistent current about each of said circular areas within said surrounding superconductive material with the direction of current flow about each of said areas being opposite to that of any of the adjacent circular areas to provide a magnetic suspension field between said bodies whereby said first body seeks a position centrally of said second body corresponding to a position of minimum magnetic field energy.

7. The device as claimed in claim 2 further including optical means for detecting the change in position of said first body with respect to said second body about orthogonal axes.

8. The device as claimed in claim 5 wherein said means for providing said magnetic field comprises an electromagnet axially centered within said float and fixed thereto, and means for energizing the electromagnet momentarily to initiate a magnetic field for creating a persistent current within said torus-shaped float.

9. The device as claimed in claim 5 wherein the central opening of said torus-shaped float is unobstructed and said hollow spherical shell forming said second body includes a pair of opposed optical windows coaxially positioned with respect to the central opening of said torus-shaped float corresponding to the nodal axis of said confined magnetic field, optical detecting means including means for passing a light beam through said aligned openings within said shell and said torus-shaped float and said device further includes means repsonsive to deflection of said light beam for sensing orthogonal deflection of said float with respect to said shell.

10. The device as claimed in claim 9 further including first light polarizing means positioned within said float and intercepting said light beam, second light polarizing means positioned exteriorly of said shell and intercepting said light beam subsequent to passage through said first light polarizing means, and means sensitive to rotation of said first light polarizing means about a common axis with respect to said second light polarizing means for indicating relative movement of said float with respect to said shell about the axis of float symmetry.

11. The device as claimed in claim 10 wherein said second light polarizing means positioned exteriorly of said shell includes a pair of spaced, light polarizing elements, said device further includes means for intercepting said light beam and splitting said light beam to direct separate portions onto said spaced light polarizing elements, photosensitive means positioned on the side of said light polarizing elements opposite said beam splitting means and means for differentially orienting the light polarizing elements such that the electrical output of the photosensitive means indicates both the direction of rotation of said float about the axis of float symmetry and the degree of rotation thereof.

12. An inertial reference comprising a non-rotating float in the form of a sphere, said sphere being substantially magnetically and physically unfeatured and having an outer surface of superconducting material, a hollow shell enclosing said float, spaced therefrom, generally spherical in shape and having at least an inner surface of superconducting material, said hollow shell further including a number of spaced openings, windows covering said openings and formed of non-magnetic material, means for maintaining a magnetic field including persistent currents surrounding said openings with said currents moving in opposite directions for adjacent openings to create a supporting magnetic field, means for maintaining said shell and float surfaces superconducting so that the magnetic field formed by the circulating current will be confined between said shell and said float whereby said float seeks a central position within said shell under the force of the confined magnetic field.

13. The device as claimed in claim 12 further including optical means for detecting a change in angular position of said float with respect to said outer shell about orthogonal axes.

14. A readout system for an inertial reference including a float positioned within a shell of like configuration by a magnetic field wherein said outer shell includes at least one transparent window therein and said float through said window is provided with a contrasting character surface pattern, said system comprising: means for reflecting a light beam from the surface of said float for forming an image including said character pattern at some point exterior of said shell, and means responsive to positional change of said pattern within said beam for sensing both the phase and magnitude in the change of angular position of said shell with respect to said float about orthogonal axes.

15. Apparatus as claimed in claim 14 wherein said indicating means includes at least one mask having alternate transparent and opaque portions positioned in the path of said image, and means responsive to the positional change of said pattern within said image as presented to said mask portions for indicating the amount and direction of relative rotation between said shell and said sphere about at least one of said orthogonal axes.

16. Apparatus as claimed in claim 15 wherein said mask includes an offset dual series of equally spaced transparent and opaque segments, said contrasting surface pattern includes a hexagonal array of non-reflective dots, the distance between dots at the image focal point being equal to the spacing of the opaque sections of the mask, and the line of offset corresponds to an image position intermediate of the extremities of said hexagonal pattern of dots whereby a change of position of said hexagonal dot pattern within said light beam image in a direction other than along the longitudinal axis of said spaced transparent and opaque segments is indicative of rotation between said shell and said float about at least one of said orthogonal axes.

17. Apparatus as claimed in claim 16 wherein said reflective light beam is split into two diverging beams at right angles to each other; and said masks are positioned so as to intercept respective images, whereby the relative change in position of said character pattern within both light beams on each of said masks is indicative of rotation of said float with respect to said shell about an axis parallel to said reflected light beam.

18. Apparatus as claimed in claim 16 wherein a pair of photocells is associated with said mask, means for splitting the light beam passing through said mask at the line of demarcation between said offset portions of said mask and directing said split light beam to individual photocells, means coupled to said photocells for indicating phase and magnitude of rotation of said shell with respect to said float, and means responsive to relative variations in light intensity falling on said cells for moving said mask to a position in which the light intensity falling on said cells is equal.

19. Apparatus as claimed in claim 18 further including means for measuring the rotation of said mask to said null position for indicating the rotational deflection of said sphere with respect to said float.

20. An optical readout system for an inertial reference including a float positioned within a shell of like configuration by magnetic suspension field wherein said outer shell includes at least one optical window therein, and said float includes a contrasting character pattern on the surface thereof, said system comprising means for reflecting a light beam from the surface of said sphere for forming an image including said character pattern at some point exterior of said shell, means for splitting said light beam to form a pair of images at right angles to each other, means for positioning a rotatable mask in the path of each of said light beams at a point where said image is formed, each of said masks including a dual series of equally spaced transparent and opaque segments, the two series of the segments being slightly offset with respect to each other, beam splitting means positioned in the path of said light beam passing through said mask and acting to split each said beam at the line of intersection between said offset portions of said mask, a pair of photocells positioned in the path of said split beam after emergence from said mask, summing means connecting the outputs of said photocells associated with one of said masks for indicating angular positional error of said shell with respect to said float about one of said orthogonal axes, and summing means connected to one of said photocells of each of said masks for providing an error signal indicative of rotation of said shell with respect to said float about an axis parallel to the axis of said light beam being reflected from the surface of said float.

21. Apparatus as claimed in claim 20 wherein each of said masks includes a servo motor, means for feeding the error signal from each of said summing devices to said associated servo motor for repositioning said mask to a position whereupon the outputs of said photocells associated with said mask are equalized, whereby the movement of said mask during repositioning is indicative of the positional change about an associated axis between said float and said shell.

22. Apparatus as claimed in claim 21 further including a third servo motor acting to rotate said shell with respect to said float about an axis parallel to the axis of said reflected light beam from the surface of said float, and means connecting the output of one of said photocells associated with one mask and one of said photocells associated with said other mask for providing an error signal to said third servo motor for repositioning said float about said stated axis, and means responsive to movement of said third servo motor for indicating the positional displacement about said given axis of said shell with respect to said float.

References Cited by the Examiner
UNITED STATES PATENTS

| | | | |
|---|---|---|---|
| 2,370,000 | 2/45 | Best. | |
| 3,017,777 | 1/62 | Haeussermann | 74—5 |
| 3,044,309 | 7/62 | Buchhold | 74—5 |

OTHER REFERENCES

"The Cryo Gyro" Machine Design, vol. 32, No. 3 (Feb. 4, 1960), pages 14–15.

ISAAC LISANN, *Primary Examiner.*

ROBERT B. HULL, *Examiner.*